G. HUNTER & C. S. MOSELEY.
CANNON-PINION FOR WATCHES.

No. 173,011. Patented Feb. 1, 1876.

WITNESSES: INVENTOR.

UNITED STATES PATENT OFFICE.

GEORGE HUNTER AND CHARLES S. MOSELEY, OF ELGIN, ILLINOIS, ASSIGNORS OF ONE-TENTH THEIR RIGHT TO THE ELGIN NATIONAL WATCH COMPANY, OF SAME PLACE.

IMPROVEMENT IN CANNON-PINIONS FOR WATCHES.

Specification forming part of Letters Patent No. 173,011, dated February 1, 1876; application filed January 12, 1876.

*To all whom it may concern:*

Be it known that we, GEORGE HUNTER and CHARLES S. MOSELEY, of Elgin, in the county of Kane and in the State of Illinois, have invented certain new and useful Improvements in Cannon-Pinions for Watches; and do hereby declare that the following is a full, clear, and exact description thereof, reference being had to the accompanying drawings, making a part of this specification, in which—

Figure 1:
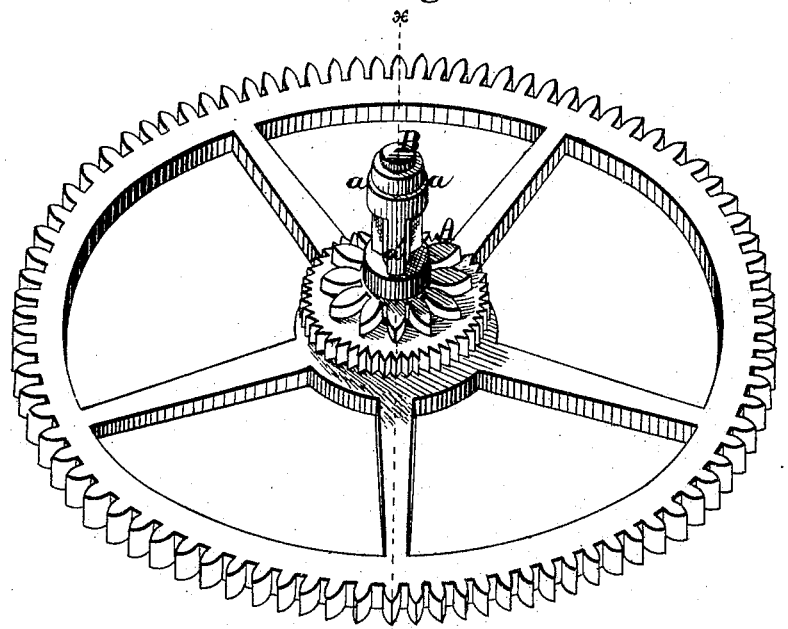
Figure 2:
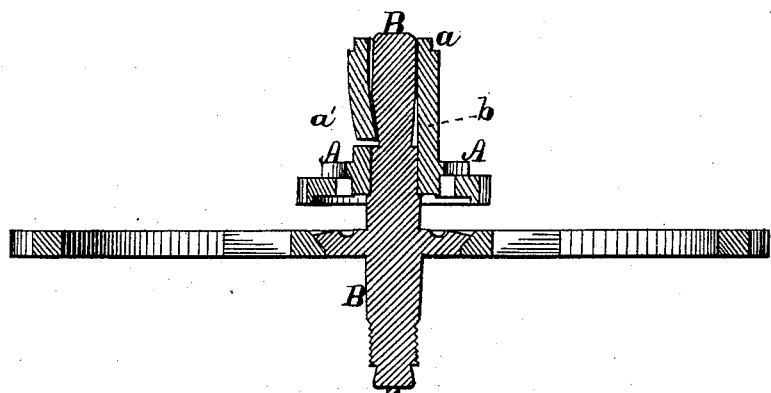
Figure 3:
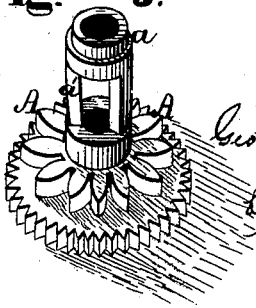

Figure 1 is a perspective view of our improved pinion in place upon the staff of a center-wheel. Fig. 2 is a central section of the same upon line $x\ x$ of Fig. 1, and Fig. 3 is a perspective view of said pinion detached from its staff.

Letters of like name and kind refer to like parts in each of the figures.

In the use of watches provided with mechanism for setting the hands from the winding-stem much difficulty is experienced from the tendency of the cannon-pinion to rise upon its staff while performing such act, so as to throw said pinion out of engagement with the hand-setting train. Another difficulty experienced in the use of cannon-pinions generally is in securing just the necessary amount of friction to drive the hands, and when the same is secured said pinions have a tendency to become loose by wear, so as to fail in the performance of their duties.

To obviate these difficulties is the design of our invention, which consists, principally, in a cannon-pinion having upon or within one side of its barrel a tongue, which is cut therefrom, and at its free end is bent slightly inward, and bears with a yielding pressure against the staff or arbor upon which said pinion is pivoted, substantially as and for the purpose hereinafter specified. It consists, further, in combining the pinion thus constructed with a staff provided with a "back taper" at the point of contact between its periphery and the inward-bent tongue, substantially as and for the purpose hereinafter shown.

In the annexed drawing, A represents a cannon-pinion of usual construction, except that upon opposite sides barrel $a$ is cut away, so as to expose its central opening for a considerable distance between its ends. One side of the remaining portion of the barrel $a$ is divided transversely at its lower end, and said severed end is bent slightly inward, as shown in Fig. 2.

As thus constructed, it will be seen that if the pinion is placed upon a staff that loosely fills its central opening the tongue $a'$ will bear against the periphery of said staff, and produce a uniform friction, which will correspond in degree to the strength of said tongue, and the amount of inward bend that is given to the same.

When the pinion is used in watches provided with hand-setting mechanism the portion of the periphery of the center-staff B which is in contact with the free end of the tongue $a'$ is formed with a "back taper," $b$, by which means the inward pressure of said tongue is caused to exert a downward pressure upon said pinion sufficient to prevent the latter from rising upon said staff, and to insure its position thereon, unless purposely removed therefrom.

Having thus fully set forth the nature and merits of our invention, what we claim as new is—

1. A cannon-pinion provided upon or within one side of its barrel with a tongue, which is cut therefrom, has an inward spring at its free end, and at such point exerts a yielding pressure upon the staff or arbor upon which said pinion is pivoted, substantially as and for the purpose specified.

2. In combination with the pinion described, a staff or arbor which is provided with a "back taper" at the point of contact between its periphery and the free end of the spring-tongue of said pinion, substantially as and for the purpose shown.

In testimony that we claim the foregoing we have hereunto set our hands this 19th day of April, 1875.

GEORGE HUNTER.
CHARLES S. MOSELEY.

Witnesses:
PATTEN S. BARTLETT,
JAMES HENRY.